United States Patent
Parikh et al.

(10) Patent No.: US 9,835,456 B1
(45) Date of Patent: Dec. 5, 2017

(54) WHEELCHAIR ASSISTANCE SYSTEM

(71) Applicant: FUJITSU LIMITED, Kawasaki-shi, Kanagawa (JP)

(72) Inventors: Samir Parikh, San Jose, CA (US); Daiki Masumoto, Cupertino, CA (US)

(73) Assignee: FUJITSU LIMITED, Kawasaki (JP)

( * ) Notice: Subject to any disclaimer, the term of this patent is extended or adjusted under 35 U.S.C. 154(b) by 25 days.

(21) Appl. No.: 15/151,464

(22) Filed: May 10, 2016

(51) Int. Cl.
| | |
|---|---|
| G01C 21/00 | (2006.01) |
| A61H 3/04 | (2006.01) |
| H04L 29/08 | (2006.01) |

(52) U.S. Cl.
CPC .............. *G01C 21/00* (2013.01); *A61H 3/04* (2013.01); *H04L 67/125* (2013.01); *A61H 2003/043* (2013.01)

(58) Field of Classification Search
CPC .......... G01C 21/00; A61H 3/04; H04L 67/125
See application file for complete search history.

(56) References Cited

U.S. PATENT DOCUMENTS

2017/0150905 A1* 6/2017 Shen ..................... A61B 5/1115

OTHER PUBLICATIONS

Life Alert, Life Alert Emergency Response, Inc. Retrieved on Aug. 17, 2016, Retrieved from <Emhttp://www.lifealert.com/about.aspx>.
Lucy, "Introducing uberASSIST," uber Newsroom, Jul. 14, 2015, Retrieved from <https://newsroom.uber.com/us-california/introducing-uberassist-la/>.
OnStar, Retrieved on Aug. 17, 2016, Retrieved from <https://www.onstar.com/us/en/services/emergency.html>.
WheelMate, Coloplast, Retrieved on Aug. 17, 2016, Retrieved from <http://www.wheelmate.com/en/>.
Wheelmap.org, Wikipedia, May 22, 2016, Retrieved from <https://en.wikipedia.org/wiki/Wheelmap.org>.
It's Accessible, SDI, Retrieved on Aug. 17, 2016, Retrieved from <http://www.esaccesibleapp.com/its-accessible/>.

\* cited by examiner

*Primary Examiner* — Basil T Jos
(74) *Attorney, Agent, or Firm* — Maschoff Brennan

(57) ABSTRACT

A method may include obtaining current sensor information that corresponds to one or more sensors of a wheelchair and that indicates a current state of the wheelchair and its surrounding environment. The method may further include obtaining current situation information that indicates a current situation of a wheelchair and its corresponding user. In addition, the method may include determining current solution information that corresponds to a current solution to help navigate the current situation. The current solution information may be determined based on one or more of the following: the current situation information and the current sensor information. The method may additionally include implementing the current solution based on the current solution information.

20 Claims, 6 Drawing Sheets

WHEELCHAIR ASSISTANCE SYSTEM

FIELD

The embodiments discussed in the present disclosure are related to a wheelchair assistance service.

BACKGROUND

Wheelchair bound persons may encounter situations where they may need assistance in overcoming the situations. For example, an incline may be prohibitively steep, wheels may get stuck, batteries or motors may die, weather may be poor, etc.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of an embodiment, a method may include obtaining current sensor information that corresponds to one or more sensors of a wheelchair and that indicates a current state of the wheelchair and its surrounding environment. The method may further include obtaining current situation information that indicates a current situation of a wheelchair and its corresponding user. In addition, the method may include determining current solution information that corresponds to a current solution to help navigate the current situation. The current solution information may be determined based on one or more of the following: the current situation information and the current sensor information. The method may additionally include implementing the current solution based on the current solution information.

The objects and advantages of the embodiments will be realized and achieved at least by the elements, features, and combinations particularly pointed out in the claims. Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Some embodiments described in the present disclosure relate to methods and systems of providing assistance to wheelchair bound persons. For example, in some embodiments, an assistance module may be configured to obtain current situation information about a situation of a wheelchair and its corresponding user. The assistance module may be configured to determine and provide a solution to help navigate the situation. In some embodiments, the assistance module may be configured to automatically implement the solution. In these or other embodiments, the assistance module may be configured to determine the solution based on sensor information that corresponds to one or more sensors of the wheelchair.

Embodiments of the present disclosure are explained with reference to the accompanying drawings.

Figure 1:
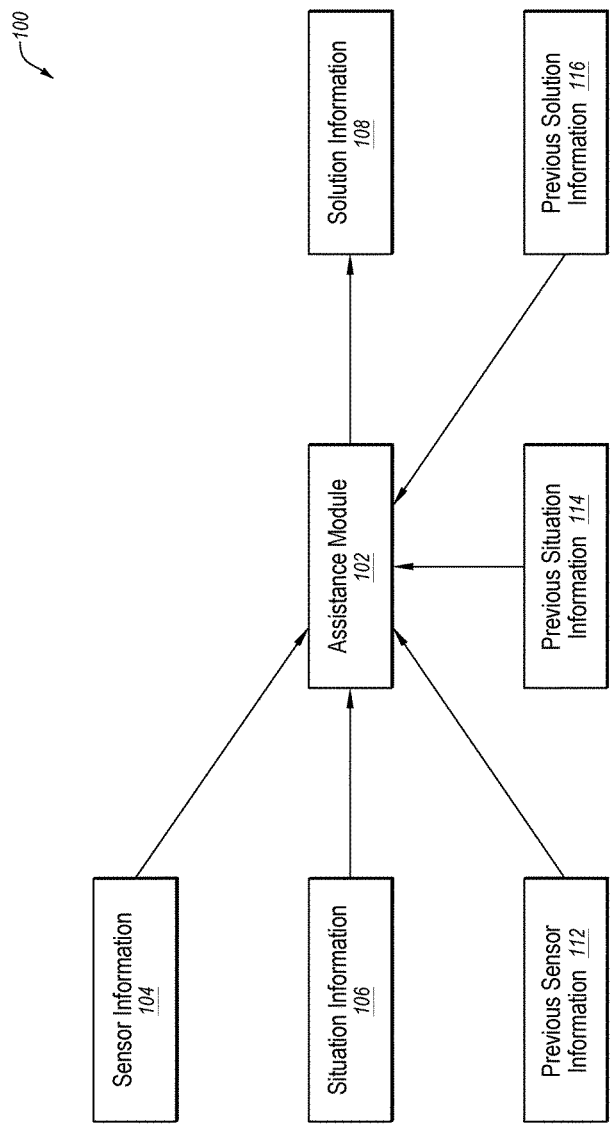
FIG. 1 is a diagram representing an example environment related to providing assistance to wheelchair bound persons.

FIG. 1 is a diagram representing an example environment 100 related to providing assistance to wheelchair bound persons, arranged in accordance with at least one embodiment described in the present disclosure. The environment 100 may include an assistance module 102 configured to obtain sensor information 104 and situation information 106 with respect to a wheelchair and to determine solution information 108 based on the sensor information 104 and the situation information 106.

The assistance module 102 may include code and routines configured to enable a computing device to perform one or more operations to determine the solution information 108 based on the sensor information 104 and the situation information 106. Additionally or alternatively, the assistance module 102 may be implemented using hardware including a processor, a microprocessor (e.g., to perform or control performance of one or more operations), a field-programmable gate array (FPGA), or an application-specific integrated circuit (ASIC). In some other instances, the assistance module 102 may be implemented using a combination of hardware and software. In the present disclosure, operations described as being performed by the assistance module 102 may include operations that the assistance module 102 may direct a corresponding system to perform.

The sensor information 104 may include any suitable information that may indicate a current state of the wheelchair or of its surrounding environment. For example, the sensor information 104 may include battery data of a battery system of the wheelchair, motor data of a motor of the wheelchair, orientation data, wheel status data, location data, movement data, environmental data, etc.

The battery data may indicate a status of the battery system of the wheelchair. For example, the battery data may indicate one or more battery parameters such as: a charge level, a discharge rate, a charge rate, a temperature, a time until empty, a distance until empty, etc. about the battery. The battery data may be obtained from one or more battery sensors that may be included with the wheelchair and that may be configured to measure, obtain, or determine one or more of the battery parameters.

The motor data may indicate a status of the motor of the wheelchair. For example, the motor data may indicate one or more motor parameters such as: a load level of the motor, revolutions per minute (RPM) of the motor, temperature of the motor, etc. The motor data may be obtained from one or more motor sensors that may be included with the wheelchair and that may be configured to measure, obtain, or determine one or more of the motor parameters.

The orientation data may indicate an orientation of the wheelchair. For example, the orientation data may indicate one or more orientation parameters such as: whether the wheelchair is on a flat surface or an inclined surface, whether the wheelchair is heading up an inclined surface, heading down an inclined surface, heading laterally across an inclined surface, whether the wheelchair is on its side, etc. The orientation data may be obtained from one or more orientation sensors that may be included with the wheelchair and that may be configured to measure, obtain, or determine one or more of the orientation parameters.

The wheel status data may indicate activity of one or more of the wheels of the wheelchair. For example, the wheel status data may indicate wheel parameters such as: whether a wheel is free spinning (indicating that it may be off the ground), slipping, or being propelled forward or backward. The wheel status data may be obtained from one or more wheel sensors that may be included with the wheelchair and that may be configured to measure, obtain, or determine one or more of the wheel parameters.

The location data may indicate location parameters such as global coordinates (e.g., latitude and longitude) of the wheelchair, a location on a map of the wheelchair, etc. The movement data may indicate one or more movement parameters such as: speed, acceleration, or direction of travel of the wheelchair. In some embodiments, at least some of the movement data may be obtained based on the location data. The location data and the movement data may be obtained from one or more location or movement sensors that may correspond to the wheelchair or another device of the user of the wheelchair (e.g., a smartphone) and that may be configured to measure, obtain, or determine one or more location or movement parameters.

The environmental data may indicate information regarding an environment surrounding the wheelchair. For example, the environmental data may indicate one or more environmental parameters such as: temperature, humidity, precipitation, etc. The environmental data may be obtained from one or more environmental sensors that may correspond to the wheelchair or another device of the user of the wheelchair (e.g., a smartphone) and that may be configured to measure, obtain, or determine one or more environmental parameters.

In some embodiments, the assistance module 102 may be configured to determine the sensor information 104 by obtaining, from one or more sensors, parameters that may indicate the current situation of the wheelchair user. In these or other embodiments, the assistance module 102 may be configured to include the obtained parameters in the sensor information 104. Additionally or alternatively, the assistance module 102 may be configured to determine other parameters from the obtained parameters that may also be included in the sensor information 104.

For example, the assistance module 102 may obtain battery parameters such as a battery level and a battery discharge rate as well as a movement parameter such as speed. Based on the battery level, the battery discharge rate, and the speed, the assistance module 102 may be configured to determine a distance until the battery is empty.

As another example, the assistance module 102 may be configured to obtain a GPS location of the wheelchair. The assistance module 102 may be configured to connect to a network to look up weather conditions for the obtained GPS location. The assistance module 102 may then include the weather conditions with the sensor information 104.

The situation information 106 may indicate a current situation of the wheelchair. For example, the situation information 106 may indicate that the wheelchair is about to run out of battery power, has a full amount of battery power, is stuck on an incline, is tipped over, is proceeding down an incline at a high rate of speed, is stuck in a hole, is high centered, or any other potential situation that the wheelchair and its associated user may encounter.

In some embodiments, the situation information 106 may be obtained from a user such as the user of the wheelchair. For example, the user may indicate to the assistance module 102 (e.g., via a user interface of a device such as a smartphone of the user) that the user has encountered a situation in which the user may need assistance. The assistance module 102 may be configured to generate one or more inquiries requesting that the user describe the encountered situation. The answers to those inquiries may be compiled and used as the situation information 106.

In these or other embodiments, the assistance module 102 may be configured to obtain the situation information 106 based on the sensor information 104. For example, the sensor information 104 may indicate that the battery level of the battery system is at 10% and that the battery system is discharging at relatively steady rate such that the assistance module 102 may determine that the wheelchair may run out of battery power within a relatively short period of time and may save the corresponding determination as situation information 106.

As another example, the sensor information 104 may indicate that the wheelchair is on an incline and facing up the incline. The sensor information 104 may also indicate that the wheelchair is moving relatively slowly or is stopped but that the motor has a relatively high load applied to it. Based on such information, the assistance module 102 may determine that the wheelchair is struggling to move up the incline and may save the corresponding determination as situation information 106.

As another example, the sensor information 104 may indicate that it is raining such that the assistance module 102 may determine that the wheelchair and corresponding user are in the rain and getting wet and may save the corresponding determination as situation information 106.

As another example, the sensor information 104 may indicate that one or more of the wheels of the wheelchair are being driven and spinning but may also indicate that the wheelchair is not moving. The assistance module 102 may accordingly determine that the wheelchair may be stuck and may save the corresponding determination as situation information 106.

In these or other embodiments, the assistance module 102 may be configured to determine the situation information 106 based on previous sensor information 112 or previous situation information 114. In some embodiments the previous situation information 114 may include situation information that may correspond to previous situations that may have been previously encountered by the user or other wheelchair users. For example, in some embodiments, the previous situation information 114 may include situation information that may be gathered based on crowdsourcing of information from the user of the wheelchair, other users of the wheelchair, or other users of other wheelchairs. Further, the previous sensor information 112 may include sensor information that may correspond to the previous situations. In some embodiments, the previous sensor information 112 may also be gathered via crowdsourcing. In some embodiments, the previous sensor information 112 and the previous situation information 114 may be stored in a manner such that particular previous sensor information 112 that corresponds to particular previous situation information 114 may be correlated with each other.

In these or other embodiments, the assistance module 102 may be configured to use the sensor information 104 and the correlations between the previous situation information 114 and the previous sensor information 112 to determine the situation information 106. For example, the assistance module 102 may be configured to compare the sensor information 104 with the previous sensor information 112. The assistance module 102 may be configured to identify previous sensor information 112 that is of a same or similar type as that of the sensor information 104. For example, the sensor information 104 may include battery data and motor data and the assistance module 102 may be configured to accordingly identify battery data and motor data included in the previous sensor information 112. In these or other embodiments, the assistance module 102 may be configured to identify previous sensor information 112 that is within a threshold range of the sensor information 104. For example, the assistance module 102 may be configured to identify previous sensor information 112 that has values within a particular percentage as values of the sensor information 104 that is of the same or similar type. In some embodiments, the threshold (e.g., percentage range) may be based on a target degree of accuracy.

The assistance module 102 may be configured to designate, as similar sensor information, previous sensor information 112 that is of the same or similar type and within the threshold range as the sensor information 104. The assistance module 102 may be configured to identify corresponding previous situation information 114 that may be correlated with the previous sensor information 112 that is designated as similar sensor information. The corresponding previous situation information 114 may be identified as similar situation information that corresponds to a previous situation that is similar to the current situation. The assistance module 102 may determine the situation information 106 by selecting the similar situation information as the situation information 106.

The solution information 108 may correspond to a solution that may help navigate the situation that may correspond to the situation information 106. In some embodiments, the solution information 108 may include instructions that may be used to implement at least a portion of the current solution. In some embodiments, the assistance module 102 may communicate the solution information 108 to the wheelchair such that the instructions included therein may control the wheelchair and direct it to implement the solution. In these or other embodiments, the solution information 108 may include instructions that direct a device of the user (e.g., a smartphone) to connect the user to a communication center that provides live help via phone calls, texts, or video chats (e.g., via an automated system or a human). Additionally or alternatively, the solution information 108 may include instructions that page a previously registered volunteer to provide assistance to the wheelchair user. In these or other embodiments, the solution information 108 may include instructions for the user that may instruct the user on how to assist in implementing the current solution. In some embodiments, the assistance module 102 may be configured to automatically implement the determined solution by automatically communicating or executing the solution information 108.

In some embodiments, the assistance module 102 may be configured to determine the solution information 108 based on the sensor information 104, the situation information 106, or both the sensor information 104 and the situation information 106. For example, in some embodiments, the sensor information 104 may indicate that the wheelchair is on a steep incline, that the motor is heavily loaded, that the motor is overheated, that the wheelchair is not moving, and that the wheelchair is on a path with a particular width. The assistance module 102 may be configured to use the sensor information 104 to determine the solution information 108 by determining, for example, a zig-zag trajectory up and along the path based on the width of the path, the incline of the path, and the load of the motor. Additionally or alternatively, the assistance module 102 may be configured to generate solution information 108 that provides for a rest period to allow the motor to cool down. In these or other embodiments, the assistance module 102 may be configured to generate solution information 108 that may page a volunteer to come and provide assistance to the wheelchair user.

By way of another example, the situation information 106 or the sensor information 104 may indicate that the wheelchair is stuck in a rut, a hole, on train tracks, etc. The assistance module 102 may accordingly generate solution information 108 that corresponds to having the wheelchair rock back and forth to get it unstuck. As another example, the situation information 106 or the sensor information 104 may indicate that the wheelchair and the associated user are being rained on. In such instances, the assistance module 102 may be configured to generate solution information 108 that may direct the wheelchair to shelter based on current location data of the wheelchair or that may connect the user with a communication center where a person may help direct the person to shelter. As another example, the situation information 106 or the sensor information 104 may indicate that the battery level of the wheelchair is getting low. The assistance module 102 may be configured to direct the wheelchair to a battery charging location based on location data of the wheelchair. Additionally or alternatively, the assistance module 102 may be configured to page a volunteer to help push the wheelchair in case it runs out of battery power. In these or other embodiments, the assistance module 102 may connect the wheelchair user to the communication center and a person may help direct the wheelchair user to a charging station.

In these or other embodiments, the assistance module 102 may be configured to determine the solution information 108 based on the sensor information 104, the situation information 106, the previous sensor information 112, the previous situation information 114, previous solution information 116, or any applicable combination thereof. For example, as mentioned above, in some embodiments the previous situation information 114 may include situation information that may correspond to previous situations that may have been previously encountered by the user or other wheelchair users (e.g., obtained via crowdsourcing). Further, the previous sensor information 112 may include sensor information that may correspond to the previous situations (e.g., obtained via crowdsourcing). Additionally or alternatively, the previous solution information 116 may include solutions to previous situations that may have been encountered by the wheelchair user or other wheelchair users. In some embodiments, the previous solution information 116 may be obtained via crowdsourcing. In these or other embodiments, the previous sensor information 112, the previous situation information 114, and the previous solution information 116 may be stored in a manner such that particular previous solution information 116 that corresponds to particular previous sensor information 112 and/or that corresponds to particular previous situation information 114 may be correlated with each other.

In these or other embodiments, the assistance module 102 may be configured to use the sensor information 104 and/or the situation information 106 and the correlations between the previous solution information 116, the previous situation information 114, and the previous sensor information 112 to determine the solution information 108. For example, the assistance module 102 may be configured to compare the sensor information 104 with the previous sensor information 112. The assistance module 102 may be configured to identify previous sensor information 112 that is of a same or similar type as that of the sensor information 104, such as described above. In these or other embodiments, the assistance module 102 may be configured to identify previous sensor information 112 that is within a threshold range of the sensor information 104 such as described above.

The assistance module 102 may be configured to designate, as similar sensor information, previous sensor information 112 that is of the same or similar type and within the threshold range as the sensor information 104. The assistance module 102 may be configured to identify corresponding previous solution information 116 that may be correlated with the previous sensor information 112 that is designated as similar sensor information. The corresponding previous solution information 116 may be identified as similar solution information that corresponds to a previous solution that may work as a solution for a current situation of the wheelchair user. The assistance module 102 may determine the solution information 108 by selecting the similar solution information as the solution information 108.

In these or other embodiments, as another example, the assistance module 102 may be configured to compare the situation information 106 with the previous situation information 114. The assistance module 102 may be configured to identify previous situation information 114 that is similar to situation information 106 based on the comparison The assistance module 102 may be configured to designate, as similar situation information, previous situation information 114 that is determined to be the same or similar to the situation information 106 from the comparison. The assistance module 102 may be configured to identify corresponding previous solution information 116 that may be correlated with the previous situation information 114 that is designated as similar situation information. The corresponding previous solution information 116 may be identified as similar solution information that corresponds to a previous solution that may work as a solution for a current situation of the wheelchair user that may be indicated in the situation information 106. The assistance module 102 may determine the solution information 108 by selecting the similar solution information as the solution information 108.

Additionally or alternatively, the assistance module 102 may be configured to cause descriptions of previous situations that correspond to at least a portion of the previous situation information 114 to be displayed on a screen viewable by the user. The user may be able to select a description that best matches the current situation and the assistance module 102 may be configured to identify the previous situation information 114 that corresponds to the selected description as corresponding to the current situation. The previous solution information 116 that corresponds to the identified previous situation information 114 may be identified and used as the solution information 108.

Therefore, the assistance module 102 may be configured to generate solution information 108 that may be used to provide assistance to a wheelchair user. Modifications, additions, or omissions may be made to FIG. 1 without departing from the scope of the present disclosure. For example, the environment 100 may include more or fewer elements than those illustrated and described in the present disclosure. In addition, in some embodiments, one or more routines, one or more instructions, or at least a portion of code of the assistance module 102 may be included on one or more devices such that the assistance module 102 may be implemented on a distributed system or on a local system. Further, some functions of the assistance module 102 may vary depending on the device with which the assistance module 102 may be included.

Figure 2:
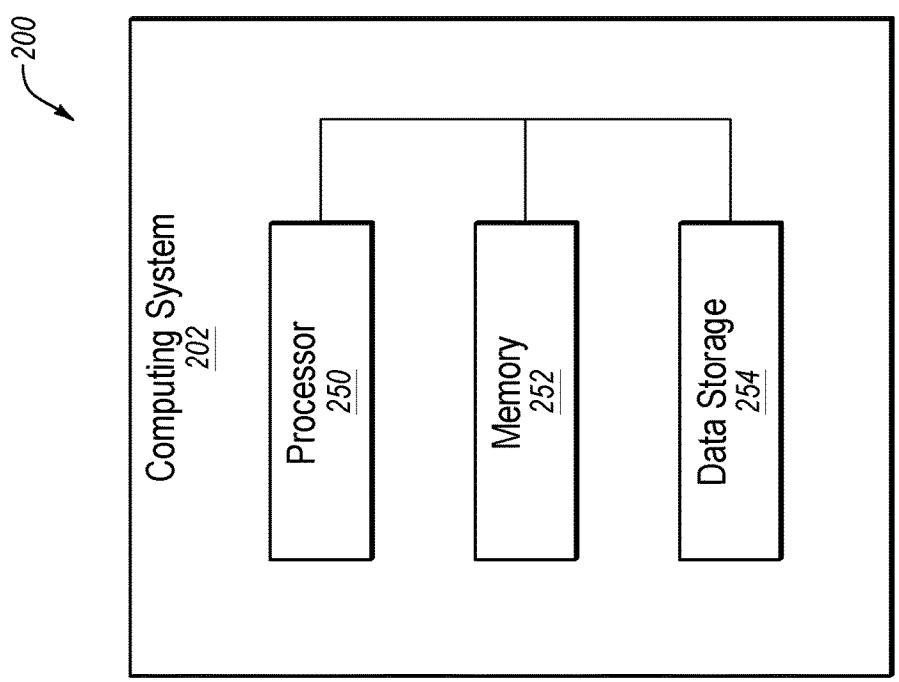
FIG. 2 illustrates an example computing system that may be configured to perform operations related to providing assistance to wheelchair bound persons.

FIG. 2 illustrates a block diagram of an example computing system 202, according to at least one embodiment of the present disclosure. The computing system 202 may be configured to implement or direct one or more operations associated with an assistance module (e.g., the assistance module 102 of FIG. 1). The computing system 202 may include a processor 250, a memory 252, and a data storage 254. The processor 250, the memory 252, and the data storage 254 may be communicatively coupled.

In general, the processor 250 may include any suitable special-purpose or general-purpose computer, computing entity, or processing device including various computer hardware or software modules and may be configured to execute instructions stored on any applicable computer-readable storage media. For example, the processor 250 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 2, the processor 250 may include any number of processors configured to, individually or collectively, perform or direct performance of any number of operations described in the present disclosure. Additionally, one or more of the processors may be present on one or more different electronic devices, such as different servers.

In some embodiments, the processor 250 may be configured to interpret and/or execute program instructions and/or process data stored in the memory 252, the data storage 254, or the memory 252 and the data storage 254. In some embodiments, the processor 250 may fetch program instructions from the data storage 254 and load the program instructions in the memory 252. After the program instructions are loaded into memory 252, the processor 250 may execute the program instructions.

For example, in some embodiments, the assistance module may be included in the data storage 254 as program instructions. The processor 250 may fetch the program instructions of the assistance module from the data storage 254 and may load the program instructions of the assistance module in the memory 252. After the program instructions of the assistance module are loaded into memory 252, the processor 250 may execute the program instructions such that the computing system may implement the operations associated with the assistance module as directed by the instructions.

The memory 252 and the data storage 254 may include computer-readable storage media for carrying or having computer-executable instructions or data structures stored thereon. Such computer-readable storage media may include any available media that may be accessed by a general-purpose or special-purpose computer, such as the processor 250. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 250 to perform a certain operation or group of operations.

Modifications, additions, or omissions may be made to the computing system 202 without departing from the scope of the present disclosure. For example, in some embodiments, the computing system 202 may include any number of other components that may not be explicitly illustrated or described.

Figure 3:
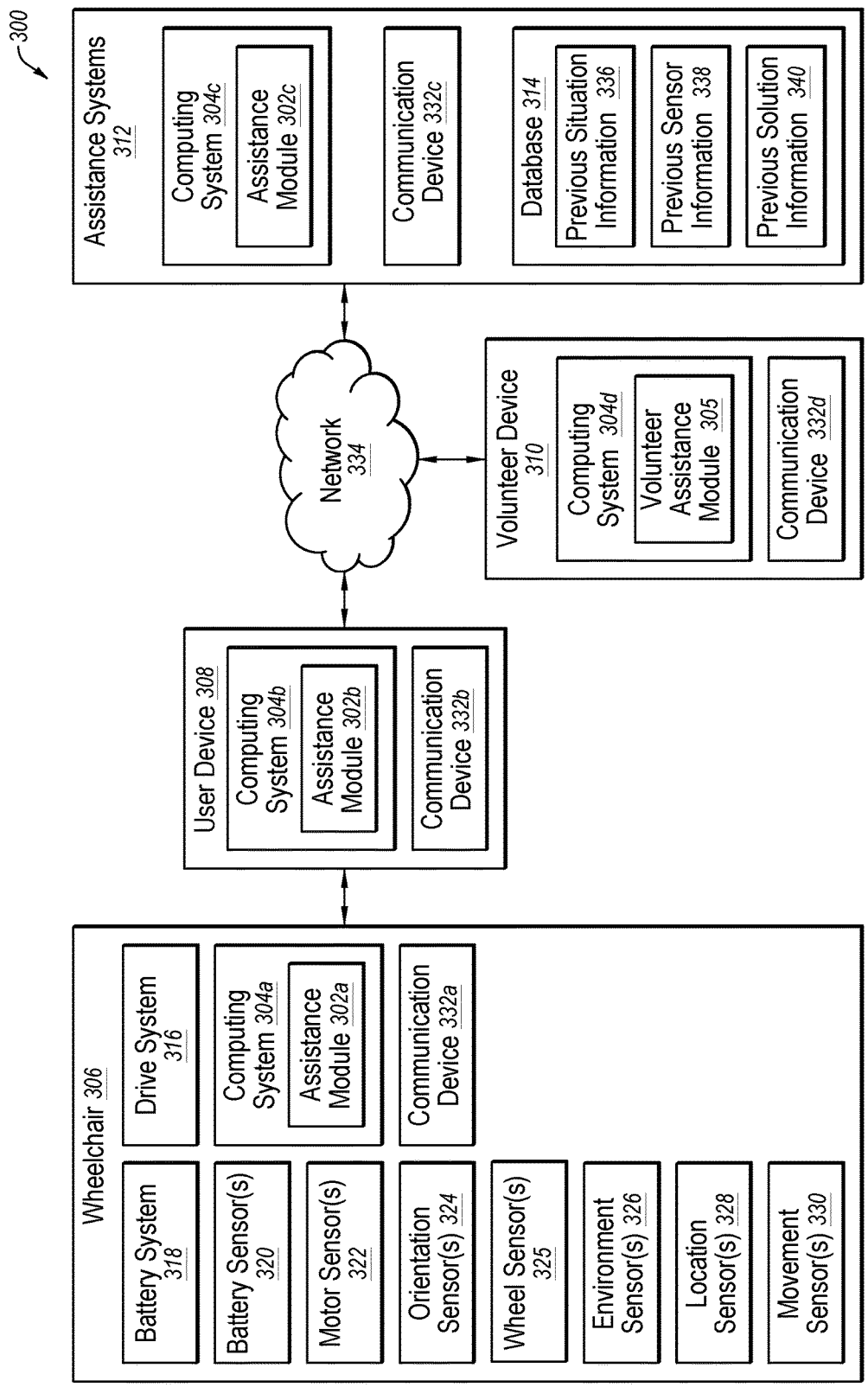
FIG. 3 is a diagram of an example system configured to provide assistance to wheelchair bound persons.

FIG. 3 is a diagram of an example system 300 configured to provide assistance to wheelchair bound persons, according to at least one embodiment of the present disclosure. The system 300 may include a wheelchair 306, a user device 308, a volunteer device 310, an assistance system 312, a database 314, and a network 334.

The wheelchair 306 may include multiple components that may be configured such that they may be used to provide assistance to wheelchair bound persons. In some embodiments, the wheelchair 306 may include a battery system 318 that may include one or more batteries configured to provide power to a drive system 316. The batteries of the battery system 318 may include any suitable type of battery. The drive system 316 may include any suitable type of system that may be configured to rotate one or more wheels of the wheelchair 306 using power that may be supplied by the battery system 318. For example, the drive system 316 may include one or more motors configured to rotate one or more respective shafts in response to receiving power from the battery system 318. The one or more shafts may be configured to cause one or more respective wheels of the wheelchair 306 to rotate via any suitable system.

The wheelchair 306 may also include one or more sensors that may each be configured to obtain one or more parameters that may be included as sensor information, such as the sensor information 104 of FIG. 1. For example, in the illustrated embodiment, the wheelchair 306 may include one or more battery sensors 320, one or more motor sensors 322, one or more orientation sensors 324, one or more wheel sensors 325, one or more environment sensors 326, one or more location sensors 328, and one or more movement sensors 330.

The battery sensors 320 may include any suitable system, apparatus, or device that may be configured to obtain or measure one or more battery parameters such as those listed above. By way of example, the battery sensors 320 may include a thermometer, a voltmeter, an ammeter, a load gauge, a discharge rate meter, a charge rate meter, etc.

The motor sensors 322 may include any suitable system, apparatus, or device that may be configured to obtain or measure one or more motor parameters such as those listed above. By way of example, the motor sensors 322 may include a thermometer, an overload sensor, a load sensor, an RPM sensor, etc.

The orientation sensors 324 may include any suitable system, apparatus, or device that may be configured to obtain or measure orientation parameters such as those listed above. By way of example, the orientation sensors 324 may include a gyroscope, an accelerometer, an incline sensor, a compass, etc.

The wheel sensors 325 may include any suitable system, apparatus, or device that may be configured to obtain or measure wheel parameters such as those listed above. By way of example, the wheel sensors 325 may include a rotary encoder, (mechanical or optical), a hall effect sensor, etc.

The environment sensors 326 may include any suitable system, apparatus, or device that may be configured to obtain or measure environmental parameters such as those listed above. By way of example, the environment sensors 326 may include a rain sensor, a radar scanner, a LIDAR scanner (2D or 3D), a depth camera, a stereo camera, a camera, an audio sensor (e.g., microphone), etc.

The location sensors 328 may include any suitable system, apparatus, or device that may be configured to obtain or measure location parameters such as those listed above. By way of example, the location sensors 328 may include global positioning system (GPS) sensors configured to obtain global coordinates, a LIDAR scanner and applicable algorithms, etc. . . . . .

The movement sensors 330 may include any suitable system, apparatus, or device that may be configured to obtain or measure movement parameters such as those listed above. By way of example, the movement sensors 330 may include an accelerometer, a speedometer, a compass, a rotary encoder, (mechanical or optical), a hall effect sensor, etc.

The wheelchair 306 may also include a computing system 304a. The computing system 304a may be analogous to the computing system 202 of FIG. 2 Additionally, in some embodiments, the computing system 304a may be configured to obtain the respective parameters from the sensors to obtain sensor information, such as sensor information 104 described above.

In these or other embodiments, the computing system 304a may be configured to control the drive system 316 and the battery system 318 such that the computing system 304a may control movement of the wheelchair 306. In some embodiments, the computing system 304a may be configured to control the drive system 316 and the battery system 318 based on instructions that may be included in solution information such that the wheelchair 306 may implement a determined solution.

The communication device 332a may include any component, device, system, or combination thereof that is configured to transmit or receive information with another electronic device such as the user device 308. In some embodiments, the communication device 332a may communicate with other devices at other locations, the same location, or even other components within the same system. For example, the communication device 332a may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, etc.), and/or the like. The communication device 322a may permit data to be exchanged with a network and/or any other devices described in the present disclosure.

The user device 308 may include any suitable system, apparatus, or device that may be used by a user of a wheelchair. For example, the user device 308 may include a smartphone, a tablet computer, a laptop computer, etc. The user device 308 may include a computing system 304b, which may be analogous to the computing system 202 of FIG. 2. The user device 308 may also include a communication device 332b that may be analogous to the communication device 332a. In these or other embodiments, the user device 308 may also include one or more sensors (not explicitly illustrated) such as one or more environment sensors, one or more location sensors, or one or more movement sensors that may be analogous to the environment sensors 326, the location sensors 328, and the movement sensors 330, respectively. In some embodiments, sensor information from the sensors of the user device 308 may be used as a proxy for sensor information that may be related to the wheelchair 306.

The user device 308 and the wheelchair 306 may be configured to be communicatively coupled to each other (e.g., via the computing systems 304a and 304b) such that information may be exchanged between the wheelchair 306 and the user device 308. For example, in some embodiments, the computing system 304a may relay sensor information to the computing system 304b. In these or other embodiments, the computing system 304b may relay solution information to the computing system 304a. In some embodiments, the wheelchair 306 may be communicatively coupled to the user device 308 via a direct wired or wireless connection. In these or other embodiments, the wheelchair 306 may be communicatively coupled to the user device 308 via the network 334.

The volunteer device 310 may include any suitable system, apparatus, or device that may be used by a person who may volunteer to assist wheelchair bound persons. For example, the volunteer device 310 may include a smartphone, a tablet computer, a laptop computer, etc. The volunteer device 310 may include a computing system 304d, which may be analogous to the computing system 202 of FIG. 2. The volunteer device 310 may also include a communication device 332d that may be analogous to the communication devices 332a and 332b. In these or other embodiments, the volunteer device 310 may also include one or more sensors (not explicitly illustrated) such as one or more environment sensors, one or more location sensors, or one or more movement sensors that may be analogous to the environment sensors 326, the location sensors 328, and the movement sensors 330, respectively. In some embodiments, the computing system 304c may include a volunteer assistance module 305 stored thereon.

The volunteer assistance module 305 may include code and routines configured to enable the volunteer device 310 to perform one or more operations. Additionally or alternatively, the volunteer assistance module 305 may be implemented using hardware including a processor, a microprocessor (e.g., to perform or control performance of one or more operations), a field-programmable gate array (FPGA), or an application-specific integrated circuit (ASIC). In some other instances, the volunteer assistance module 305 may be implemented using a combination of hardware and software. In the present disclosure, operations described as being performed by the volunteer assistance module 305 may include operations that the volunteer assistance module 305 may direct the computing system 304c and/or the volunteer device 310 to perform.

The volunteer assistance module 305 may be configured to facilitate the volunteer in assisting wheelchair bound persons. For example, the volunteer assistance module 305 may be configured to register volunteers, determine their locations with respect to wheelchair bound persons, and notify volunteers of requests for help by wheelchair bound persons. In some embodiments, the volunteer assistance module 305 may be configured to perform one or more operations described below with respect to a method 600 of FIG. 6. In these or other embodiments, the volunteer assistance module 305 may be configured to perform one or more operations described with respect to the assistance module 102 of FIG. 1.

The assistance system 312 may include any configuration of hardware, such as servers and databases that are networked together and configured to perform a task. For example, the assistance system 312 may include a single computing system that includes one or more processors and memory, such as a server or some other computing system configured to perform operations as described in this disclosure. Alternately or additionally, the assistance system 312 may include multiple computing systems, such as multiple servers, that are networked together and configured to perform operations as described in this disclosure. In some embodiments, the assistance system 312 may include computer-readable-instructions that are configured to be executed by one or more devices in the system 300, such as the user device 308, the volunteer device 310, and/or the wheelchair 306. In the illustrated example, the assistance system 312 includes a computing system 304c that may be analogous to the computing system 202 of FIG. 2. The assistance system 312 may also include a communication device 332b that may be analogous to the communication devices 332a, 332b, and 332d.

In some embodiments, the assistance system 312 may include a web server that hosts webpages of a website that are accessed through URLs. In these and other embodiments, the assistance system 312 may include code, such as HTML and javascript code that may be provided to devices based on received requests. The assistance system 312 may further provide additional data as requested from a device based on instructions from the code provided by assistance system 312 executed on the device.

The assistance system 312 may include a database 314 in some embodiments. In these or other embodiments, the database 314 may include previous situation information 336, previous sensor information 338 and previous solution information 340. The previous situation information 336 may be analogous to the previous situation information 114 of FIG. 1. The previous sensor information 338 may be analogous to the previous sensor information 112 of FIG. 1. The previous solution information 340 may be analogous to the previous solution information 116 of FIG. 1.

In some embodiments, the assistance system 312 may be configured as an online assistance service that may obtain and provide information related to assisting wheelchair bound persons. For example, in some embodiments, the assistance system 312 may be configured to obtain sensor information, situation information, the previous sensor information 338, the previous situation information 336, the previous solution information 340, volunteer information, etc. from the user device 308 and/or the volunteer device 310. The assistance system 312 may be configured to generate solution information based on the obtained information and may be configured to communicate the solution information to the user device 308 and/or the volunteer device 310. Additionally or alternatively, the assistance system 312 may be configured to relay the volunteer information to the user device 308 and/or to the volunteer device 310.

The wheelchair 306, the user device 308, and/or the assistance system 312 may each include an assistance module 302 stored thereon in some embodiments. Each assistance module 302 may be configured to perform one or more operations such as those described above with respect to the assistance module 102 of FIG. 1. In some embodiments, each assistance module 302 may be configured to perform all of the operations and in other embodiments fewer of the operations. Additionally, the assistance modules 302 may be configured to relay information between each other to enable the assistance modules 302 to perform the operations described above with respect to the assistance module 102 either individually or collectively.

For example, in some embodiments, an assistance module 302a of the wheelchair 306 and an assistance module 302b of the user device 308 may be configured to relay the parameters that may be measured by the sensors of the wheelchair 306 to the assistance system 312. In these or other embodiments, the volunteer assistance module 305 may be configured to communicate volunteer information to the assistance module 302c. An assistance module 302c of the assistance system 312 may be configured to obtain sensor information, situation information, and solution information based on the relayed information. In some embodiments, the assistance module 302c may be configured to access the previous situation information 336, the previous sensor information 338, and the previous solution information 340 and to determine the solution information based on any applicable combination of the previous situation information 336, the previous sensor information 338, and the previous solution information 340. The assistance module 302c may be configured to communicate the solution information to the assistance modules 302b, which may relay it to the assistance module 302a when applicable. In these or other embodiments, the assistance module 302c may communicate at least some solution information to the volunteer assistance module 305 when applicable. Additionally or alternatively, the assistance module 302b or the assistance module 302a may be configured to perform some or all of the operations described with respect to the assistance module 302c.

The network 334 may be configured to communicatively couple the assistance system 312, the user device 308, and the volunteer device 310, with each other. In some embodiments, the network 334 may include any network or configuration of networks configured to send and receive communications between devices. In some embodiments, the network 334 may include a conventional type network, a wired or wireless network, and may have numerous different configurations. Furthermore, the network 334 may include a local area network (LAN), a wide area network (WAN) (e.g., the Internet), or other interconnected data paths across which multiple devices and/or entities may communicate. In some embodiments, the network 334 may include a peer-to-peer network. The 334 may also be coupled to or may include portions of a telecommunications network for sending data in a variety of different communication protocols. In some embodiments, the network 334 may include Bluetooth® communication networks or cellular communication networks for sending and receiving communications and/or data including via short message service (SMS), multimedia messaging service (MMS), hypertext transfer protocol (HTTP), direct data connection, wireless application protocol (WAP), e-mail, etc. The network 334 may also include a mobile data network that may include third-generation (3G), fourth-generation (4G), long-term evolution (LTE), long-term evolution advanced (LTE-A), Voice-over-LTE ("VoLTE") or any other mobile data network or combination of mobile data networks. Further, the network 334 may include one or more IEEE 802.11 wireless networks.

Modifications, additions, or omissions may be made to the system 300 without departing from the scope of the present disclosure. For example, the system 300 may include more or different devices than those illustrated. Further, in certain implementations the operations described as being performed by specific devices may vary from that described without departing from the scope of the present disclosure.

For example, in some embodiments, the system 300 may include any number of wheelchairs, user devices, or volunteer devices that may each include an assistance module 302 and that may be communicatively coupled to the network 334. Additionally or alternatively, one or more of the assistance modules 302 may be configured to provide crowdsourcing information based on their corresponding devices experiences that may be stored as previous situation information 336, previous sensor information 338, or previous solution information 340.

Figure 4:
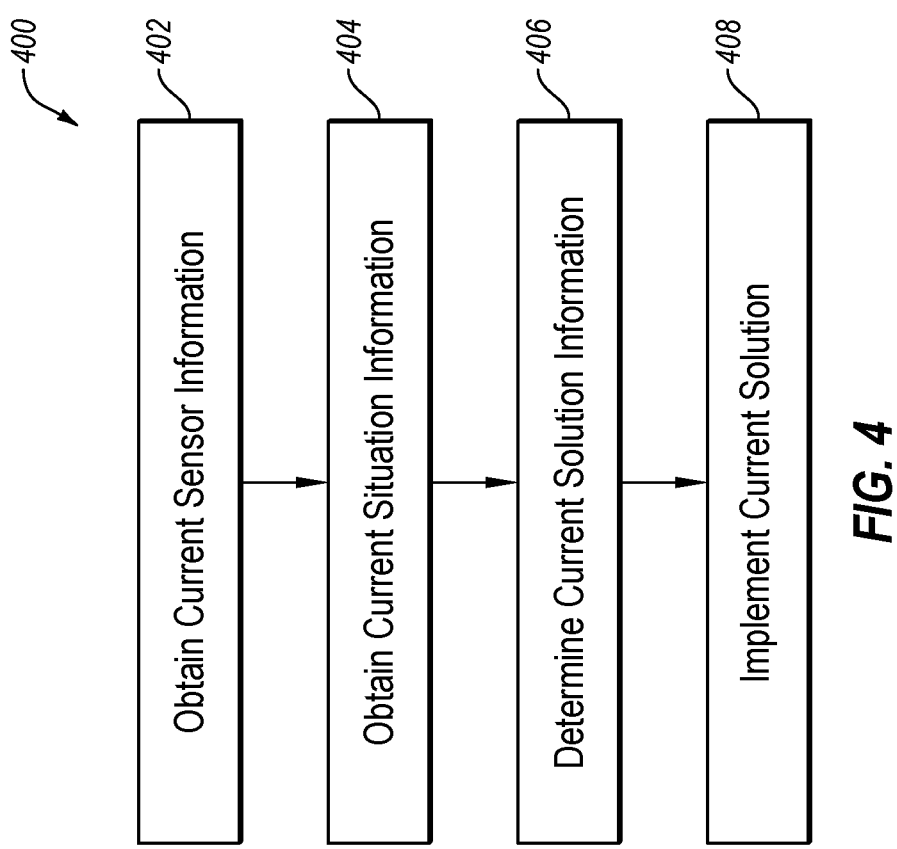
FIG. 4 is a flowchart of an example computer-implemented method of providing assistance to wheelchair bound persons.

FIG. 4 is a flowchart of an example computer-implemented method 400 of providing assistance to wheelchair bound persons, according to at least one embodiment of the present disclosure. The method 400 may be implemented, in some embodiments, by one or more assistance modules such as the assistance modules 102 or 302 of FIGS. 1 and 3. In these or other embodiments, the method 400 may be implemented by one or more components of a system that may include one or more assistance modules, such as the system 300 of FIG. 3. Although illustrated as discrete blocks, various blocks may be divided into additional blocks, combined into fewer blocks, or eliminated, depending on the desired implementation.

The method 400 may begin at block 402 where current sensor information may be obtained. The current sensor information may indicate a current state of a wheelchair and of its surrounding environment. An example of the current sensor information may include the sensor information 104. The current sensor information may be obtained in any manner described above with respect to obtaining the sensor information 104.

At block 404, current situation information may be obtained. The current situation information may indicate a current situation of the wheelchair and its corresponding user. The situation information 106 is an example of the current situation information. The current situation information may be obtained in any manner described above with respect to obtaining the situation information 106.

At block 406, current solution information may be obtained. The current solution information may correspond to a current solution that may help navigate the current situation. An example of the current solution information may include the solution information 108. The current solution information may be obtained in any manner described above with respect to obtaining the solution information 108

At block 408, the current solution may be implemented based on the current solution information. The implementation may be performed automatically in some embodiments. In these or other embodiments, the implementation of the current solution may include controlling the wheelchair to implement the current solution, paging a volunteer to provide assistance to the wheelchair user, connecting the connecting the wheelchair user to a communication center that provides live help via one or more of the following: phone calls, texts, and video chats, providing instructions to the wheelchair user that instruct the wheelchair user on how to assist in implementing the current solution, or any applicable combination thereof. In some embodiments, the paging of the volunteer may include one or more operations described below with respect to a method 500 of FIG. 5.

The functions and/or operations described with respect to FIG. 4 may be implemented in differing order without departing from the scope of the present disclosure. Furthermore, the outlined functions and operations are only provided as examples, and some of the functions and operations may be optional, combined into fewer functions and operations, or expanded into additional functions and operations without detracting from the essence of the disclosed embodiments.

Figure 5:
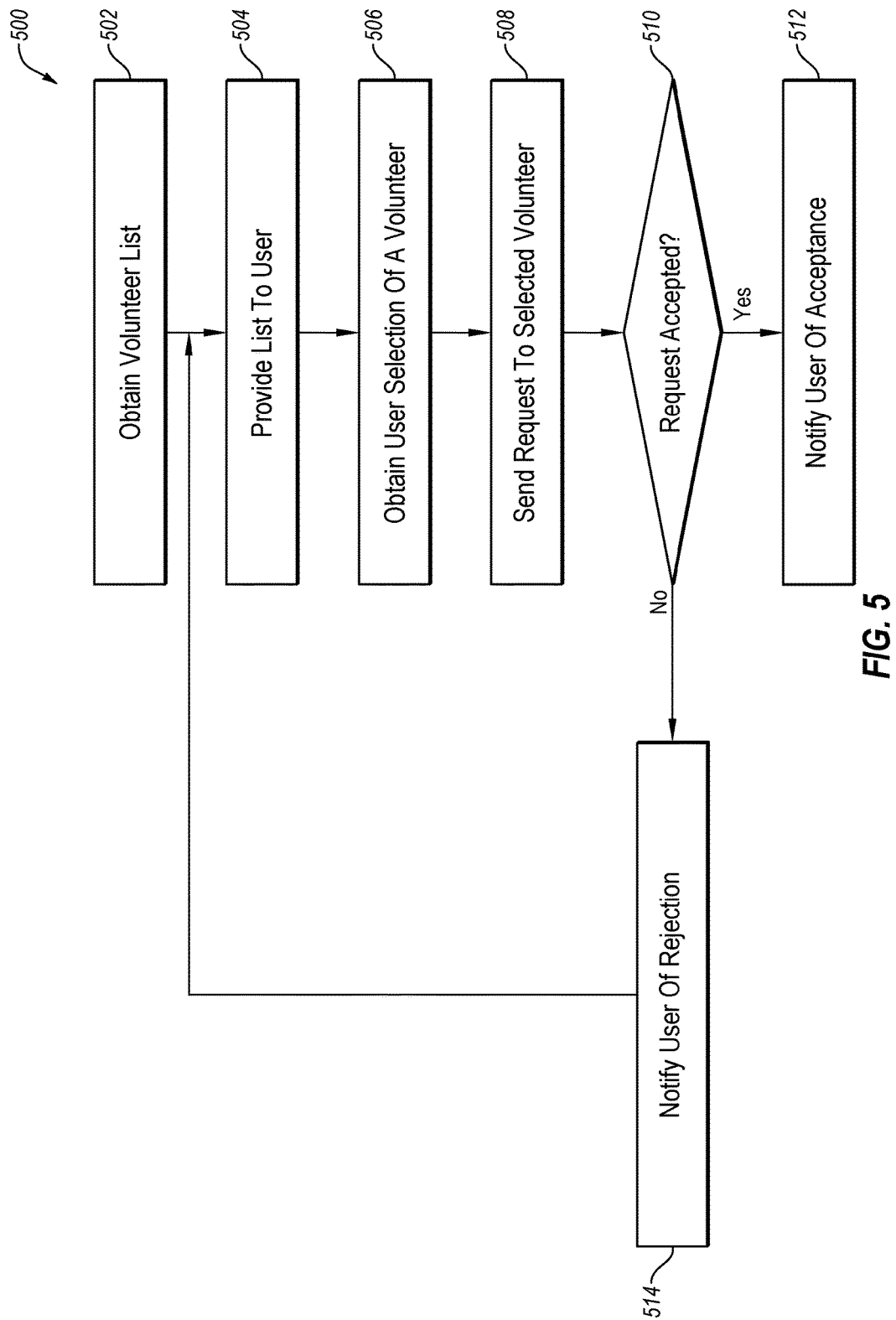
FIG. 5 is a flowchart of an example computer-implemented method of paging a volunteer to assist a wheelchair bound person.

FIG. 5 is a flowchart of an example computer-implemented method 500 of paging a volunteer to assist a wheelchair bound person, according to at least one embodiment of the present disclosure. The method 500 may be implemented, in some embodiments, by one or more assistance modules such as the assistance modules 102 or 302 of FIGS. 1 and 3. In these or other embodiments, the method 500 may be implemented by one or more components of a system that may include one or more assistance modules, such as the system 300 of FIG. 3. Although illustrated as discrete blocks, various blocks may be divided into additional blocks, combined into fewer blocks, or eliminated, depending on the desired implementation.

The method 500 may begin at block 502 where a volunteer list may be obtained. In some embodiments, the volunteer list may be stored by an assistance system, such as the assistance system 312. The volunteer list may include a list of volunteers who may have previously registered as volunteers to assist a wheelchair bound person who may be in need. In some embodiments, the volunteer list may be obtained by comparing location information of the wheelchair user with location information of registered volunteers. The volunteer list may include registered volunteers who may be within a particular distance to the wheelchair user or who may be within a particular timeframe to reach the wheelchair user. In some embodiments, the timeframe of a volunteer to the wheelchair user may be determined based on a rate of travel of the volunteer, a rate of travel of the wheelchair user, a location of the volunteer, a mode of travel of the volunteer, a direction of travel of the volunteer, terrain, obstacles, or buildings between the volunteer and the wheelchair user, traffic between the volunteer and the wheelchair user, or any other applicable parameter.

At block 504, the volunteer list may be provided to the user. At block 506, a selection by the user of a particular volunteer included in the volunteer list may be obtained.

At block 508, a request may be communicated to the selected volunteer. The request may include a notification that may notify the selected volunteer of the request for the selected volunteer to provide assistance. In some embodiments, the request may include information such as the location of the wheelchair user, a distance to the wheelchair user, or an estimated time for the selected volunteer to reach the wheelchair user.

At block 510, it may be determined whether or not the request was accepted based on a response that may be received from the selected volunteer. In response to the request being accepted, the method 500 may proceed to block 512. In response to the request not being accepted, the method 500 may proceed to block 514.

At block 512, the wheelchair user may be notified that the selected volunteer has accepted the request to provide assistance. In some embodiments, the wheelchair user may be notified by an acceptance notification that may be communicated to the wheelchair users electronic device. In these or other embodiments, the acceptance notification may include information regarding the distance of the selected volunteer to the wheelchair user and/or regarding an estimated time of arrival of the selected volunteer.

At block 514, the wheelchair user may be notified that the selected volunteer has rejected the request to provide assistance. In some embodiments, the wheelchair user may be notified by a rejection notification that may be communicated to the wheelchair users electronic device. Following block 514, the method 500 may return to block 504.

The functions and/or operations described with respect to FIG. 5 may be implemented in differing order without departing from the scope of the present disclosure. Furthermore, the outlined functions and operations are only provided as examples, and some of the functions and operations may be optional, combined into fewer functions and operations, or expanded into additional functions and operations without detracting from the essence of the disclosed embodiments.

Figure 6:
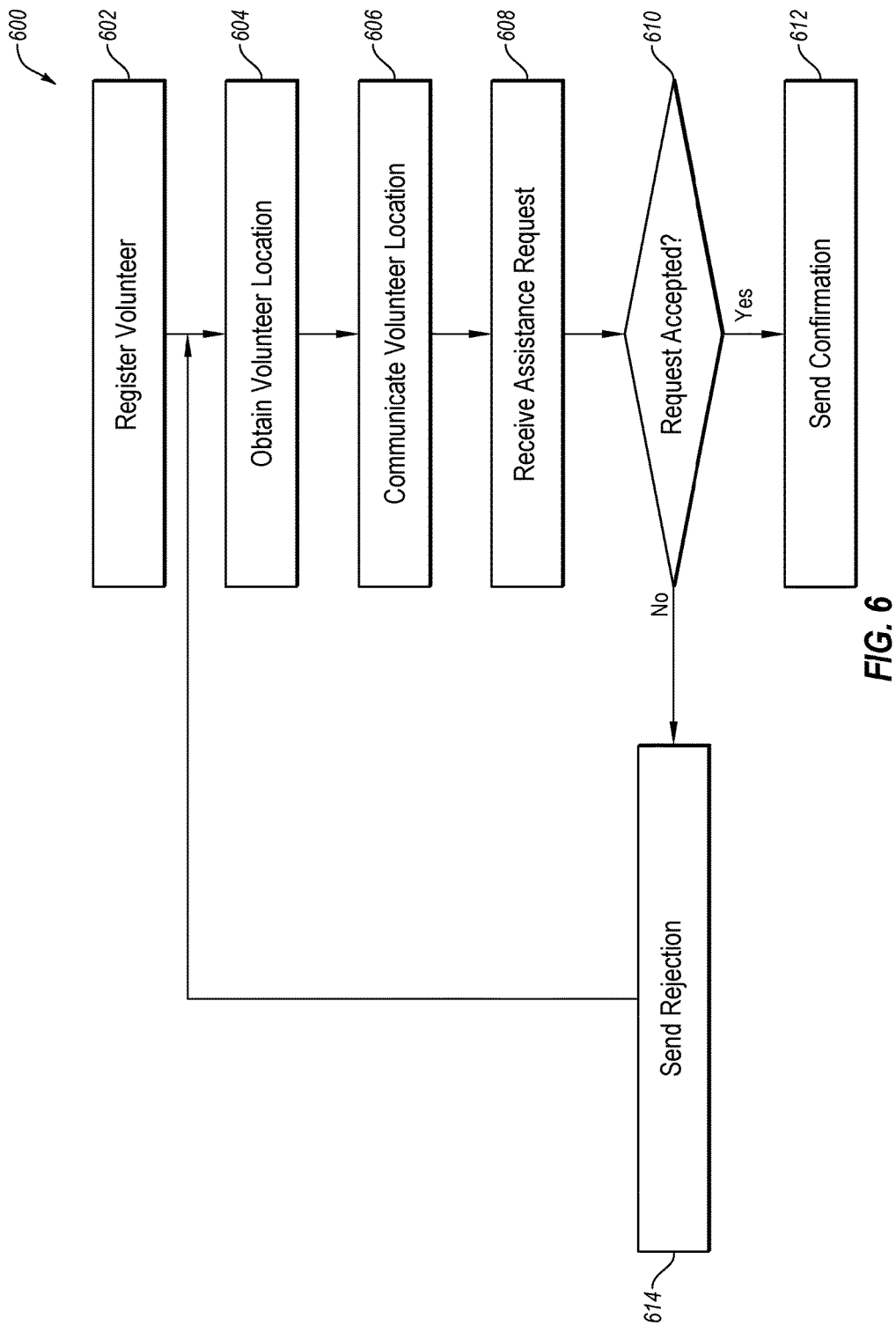
FIG. 6 is a flowchart of an example computer-implemented method related to paging a volunteer to assist a wheelchair bound person.

FIG. 6 is a flowchart of an example computer-implemented method 600 related to paging a volunteer to assist a wheelchair bound person, according to at least one embodiment of the present disclosure. The method 600 may be implemented, in some embodiments, by one or more volunteer assistance modules such as the volunteer assistance module 305 of FIG. 3. Although illustrated as discrete blocks, various blocks may be divided into additional blocks, combined into fewer blocks, or eliminated, depending on the desired implementation.

The method 600 may begin at block 602 where the volunteer may be registered with a wheelchair assistance service. The registration of the volunteer may include the recording and storing of information about the volunteer such as the volunteer's name, address, phone number, location tracking consent, etc. The registration may be such that the volunteer agrees to receive assistance requests to help wheelchair bound persons.

At block 604, a location of the registered volunteer may be obtained. In some embodiments, the location of the registered volunteer may be obtained by obtaining GPS coordinates from a corresponding volunteer device such as the volunteer device 310 of FIG. 3. In these or other embodiments, the volunteer location may be obtained on a periodic basis. At block 606, the obtained volunteer location may be communicated to a wheelchair assistance system (e.g., the assistance system 312 of FIG. 3) of the wheelchair assistance service.

At block 608, an assistance request may be received. The assistance request may include a request for the registered volunteer to assist a wheelchair user. By way of example, the assistance request that may be received at block 608 may include the assistance request that may be communicated at block 508 of the method 500 described above.

At block 610, it may be determined whether or not the request was accepted based on a response that may be received from the volunteer. In response to the request being accepted, the method 600 may proceed to block 612. In response to the request not being accepted, the method 600 may proceed to block 614.

At block 612, a confirmation that the request has been accepted may be communicated to the assistance system, which may relay the acceptance to the wheelchair user. At block 614, an indication that the request has been rejected may be communicated to the assistance system, which may relay the acceptance to the wheelchair user.

The functions and/or operations described with respect to FIG. 6 may be implemented in differing order without departing from the scope of the present disclosure. Furthermore, the outlined functions and operations are only provided as examples, and some of the functions and operations may be optional, combined into fewer functions and operations, or expanded into additional functions and operations without detracting from the essence of the disclosed embodiments.

As indicated above, the embodiments described in the present disclosure may include the use of a special purpose or general purpose computer (e.g., the processor 250 of FIG. 2) including various computer hardware or software modules, as discussed in greater detail below. Further, as indicated above, embodiments described in the present disclosure may be implemented using computer-readable media (e.g., the memory 252 or data storage 254 of FIG. 2) for carrying or having computer-executable instructions or data structures stored thereon.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method comprising:

obtaining current sensor information that corresponds to one or more sensors of a wheelchair and that indicates a current state of the wheelchair and its surrounding environment;

obtaining current situation information about a current situation of the wheelchair and its corresponding user based on the current sensor information;

determining, based on the current situation information and based on the current sensor information, current solution information that corresponds to a current solution to help navigate the current situation; and automatically implementing the current solution based on the current solution information.

2. The method of claim 1, wherein determining the current solution information includes:

searching a database that includes previous situation information that corresponds to a plurality of previous situations previously encountered by other wheelchairs and their corresponding users;

identifying, from the previous situation information, similar situation information that is at least similar to the current situation information;

identifying similar solution information from previous solution information that is stored in the database based on the similar solution information corresponding to the similar situation information; and selecting the similar solution information as the current solution information.

3. The method of claim 2, wherein identifying the similar situation information includes:

comparing the current sensor information with previous sensor information that is stored in the database and that corresponds to the previous situation information stored in the database;

identifying, from the previous sensor information and based on the comparing, similar sensor information that is of a same or similar type as the current sensor information and that is within a threshold range of the current sensor information; and identifying the similar situation information based on the similar situation information corresponding to the similar sensor information.

4. The method of claim 1, wherein determining the current situation information includes:

searching a database that includes previous situation information that corresponds to a plurality of previous situations previously encountered by other wheelchairs and their corresponding users and that includes previous sensor information that corresponds to the previous situation information;

comparing the current sensor information with the previous sensor information;
identifying similar sensor information, from the previous sensor information, of a same or similar type as the current sensor information and within a threshold value of the current sensor information based on the comparing;
identifying similar situation information from the previous situation information based on the similar situation information corresponding to the similar sensor information; and
selecting the similar situation information as the current situation information.

5. The method of claim 1, wherein the current sensor information includes one or more of the following: battery data of a battery system of the wheelchair, motor data of a motor of the wheelchair, orientation data, wheel status data, location data, movement data, and environmental data.

6. The method of claim 1, wherein automatically implementing the current solution includes controlling the wheelchair in response to instructions included in the current solution information.

7. The method of claim 1, wherein automatically implementing the current solution includes performing one or more of the following operations in response to instructions included in the current solution information:
paging a volunteer to provide assistance to the wheelchair user;
connecting the wheelchair user to a communication center that provides live help via one or more of the following: phone calls, texts, and video chats; and
providing instructions to the wheelchair user that instruct the wheelchair user on how to assist in implementing the current solution.

8. The method of claim 7, further comprising providing a distance of the volunteer to the wheelchair user and an estimated time of arrival of the volunteer.

9. The method of claim 1, further comprising:
measuring, by the one or more sensors, one or more parameters that indicate the current situation; and
providing the one or more measured parameters as the current sensor information.

10. Computer-readable storage media including computer executable instructions configured to cause a system to perform operations, the operations comprising:
obtaining current sensor information that corresponds to one or more sensors of a wheelchair and that indicates a current state of the wheelchair and its surrounding environment;
obtaining current situation information that indicates a current situation of a wheelchair and its corresponding user;
determining current solution information that corresponds to a current solution to help navigate the current situation, wherein the current solution information is determined based on one or more of the following: the current situation information and the current sensor information; and
implementing the current solution based on the current solution information.

11. The computer-readable storage media of claim 10, wherein determining the current solution information includes:
searching a database that includes previous situation information that corresponds to a plurality of previous situations previously encountered by other wheelchairs and their corresponding users;
identifying, from the previous situation information, similar situation information that is at least similar to the current situation information;
identifying similar solution information from previous solution information that is stored in the database based on the similar solution information corresponding to the similar situation information; and
selecting the similar solution information as the current solution.

12. The computer-readable storage media of claim 11, wherein identifying the similar situation information includes:
comparing the current sensor information with previous sensor information that is stored in the database and that corresponds to the previous situation information;
identifying, from the previous sensor information and based on the comparing, similar sensor information that is of a same or similar type as the current sensor information and that is within a threshold range of the current sensor information; and
identifying the similar situation information based on the similar solution information corresponding to the similar sensor information.

13. The computer-readable storage media of claim 10, wherein determining the current solution information includes:
comparing the current sensor information with previous sensor information that corresponds to a plurality of previous situations previously encountered by other wheelchair users;
identifying, from the previous sensor information and based on the comparing, similar sensor information that is of a same or similar type as the current sensor information and that is within a threshold range of the current sensor information;
identifying similar solution information from previous solution information based on the similar solution information corresponding to the similar sensor information; and
selecting the similar solution information as the current solution information.

14. The computer-readable storage media of claim 10, wherein obtaining the current situation information includes determining the current situation information based on the current sensor information.

15. The computer-readable storage media of claim 10, wherein obtaining the current situation information includes obtaining the current situation information from one or more inquiries presented to the wheelchair user via a user interface.

16. The computer-readable storage media of claim 10, further comprising:
measuring, by the one or more sensors, one or more parameters that indicate the current situation; and
providing the one or more measured parameters as the current sensor information.

17. The computer-readable storage media of claim 10, wherein the current sensor information includes one or more of the following: battery data of a battery system of the wheelchair, motor data of a motor of the wheelchair, orientation data, wheel status data, location data, movement data, and environmental data.

18. The computer-readable storage media of claim 10, wherein implementing the current solution includes automatically performing one or more of the following operations in response to instructions included in the current solution information:
controlling the wheelchair to implement the current solution;
paging a volunteer to provide assistance to the wheelchair user; and connecting the wheelchair user to a communication center that provides live help via one or more of the following: phone calls, texts, and video chats.

19. The computer-readable storage media of claim 10, wherein implementing the current solution includes providing instructions to the wheelchair user that instruct the wheelchair user on how to assist in implementing the current solution.

20. A wheelchair comprising:
- a drive system configured to control movement of the wheelchair based on received instructions;
- a plurality of sensors configured to measure one or more parameters that indicate a current situation of a wheelchair and its corresponding user;
- a computing system configured to:
  - obtain the one or more parameters from the plurality of sensors;
  - communicate the one or more parameters to a user device;
  - receive solution information from the user device, wherein the solution information is based on the one or more parameters and corresponds to a current solution to help navigate the current situation; and
  - control the drive system based on instructions included in the solution information such that the wheelchair automatically implements the current solution.

* * * * *